United States Patent
Soriano et al.

(10) Patent No.: US 8,979,456 B2
(45) Date of Patent: Mar. 17, 2015

(54) RETENTION CLIP ASSEMBLY

(71) Applicants: GM Global Technology Operations LLC, Detroit, MI (US); Alpha Stamping Company, Livonia, MI (US)

(72) Inventors: Israel Solano Soriano, Puebla (MX); Robert Stewart, Farmington Hills, MI (US); Nick Strumbos, Birmingham, MI (US); Carlos Ahlai Ruiz Avendaño, Aguascalientes CP (MX)

(73) Assignees: GM Global Technology Operations LLC, Detroit, MI (US); Alpha Stamping Company, Livonia, MI (US)

( * ) Notice: Subject to any disclaimer, the term of this patent is extended or adjusted under 35 U.S.C. 154(b) by 134 days.

(21) Appl. No.: 13/745,056

(22) Filed: Jan. 18, 2013

(65) Prior Publication Data

US 2014/0205395 A1  Jul. 24, 2014

(51) Int. Cl.
*F16B 37/02* (2006.01)
*F16B 37/04* (2006.01)
*F16B 21/18* (2006.01)

(52) U.S. Cl.
CPC ............. *F16B 37/02* (2013.01); *F16B 37/04* (2013.01); *F16B 21/18* (2013.01)
USPC ............. 411/182; 411/521; 411/526; 16/2.1

(58) Field of Classification Search
USPC ......... 411/525, 526, 520, 521, 171, 337–339, 411/433, 182, 108, 508, 913; 16/2.1, 4; 24/289, 292–295, 297, 581.11
See application file for complete search history.

(56) References Cited

U.S. PATENT DOCUMENTS

| 2,055,166 | A | * | 9/1936 | Berry ........................... 411/352 |
| 4,086,679 | A | * | 5/1978 | Butler .............................. 16/4 |
| 4,878,792 | A | * | 11/1989 | Frano ........................... 411/339 |
| 5,537,714 | A | * | 7/1996 | Lynch et al. ..................... 16/2.1 |
| 5,772,380 | A | * | 6/1998 | Cloud et al. ................... 411/508 |
| 5,871,320 | A | * | 2/1999 | Kovac .......................... 411/182 |
| 6,497,003 | B2 | * | 12/2002 | Calabrese ......................... 16/4 |
| 7,891,151 | B2 | * | 2/2011 | Sano ......................... 52/506.05 |
| 2013/0028681 | A1 | * | 1/2013 | Limpert et al. ............... 411/108 |

* cited by examiner

*Primary Examiner* — Flemming Saether
(74) *Attorney, Agent, or Firm* — Quinn Law Group, PLLC

(57) ABSTRACT

A retention clip assembly is for attachment to a stud. The assembly includes a base plate and a cover plate. The base plate includes a base rim and a locking finger extending from the base rim. The cover plate includes a cover rim and a flange. The cover rim defines a lock opening configured for receiving the locking finger therein to retain the cover plate to the base plate. The flange extends inwardly from the cover rim at an angle which is acute such that the flange overlays the cover opening and is configured for engaging the external teeth on the stud. The cover plate attached to the base plate with a sheet of material therebetween. The cover plate and base plate are positioned such that the flange engages the external teeth of the stud to prevent removal of the retention clip assembly from the stud.

16 Claims, 3 Drawing Sheets

RETENTION CLIP ASSEMBLY

TECHNICAL FIELD

The disclosure relates to a retention clip assembly for attaching a sheet of material to a stud having external teeth.

BACKGROUND

Sheets of material may be attached to panels of a vehicle. Retention clips are used to secure the sheets of material to the vehicle. The retention clips engage both the sheet of material and the panel of the vehicle. The retention clips are configured to prevent the rattling between the sheet of material and the panel. Further, the retention clips are configured to be installed onto the vehicle using as little insertion force as possible, while requiring a large force to remove the retention clip.

SUMMARY

A retention clip assembly is configured for attachment to a stud having external teeth. The retention clip assembly includes a base plate and a cover plate. The base plate includes a base rim and a locking finger. The base rim defines a base opening and the locking finger extends from the base rim. The base rim defines a base opening that is configured for receiving the stud therethrough. The cover plate includes a cover rim and a flange. The cover rim has a conical shape. The cover rim defines a cover opening that is configured for receiving the stud therethrough. The cover rim defines a lock opening that is spaced from the cover opening and is configured for receiving the locking finger therein to retain the cover plate to the base plate. The flange extends inwardly from the cover rim at an angle which is acute such that the flange overlays the cover opening and is configured for engaging the external teeth on the stud. The cover plate is configured for attachment to the base plate with a sheet of material therebetween, with the cover plate and base plate positioned such that the stud extends through the respective cover opening and base opening and the flange engages the external teeth of the stud to prevent removal of the cover plate and base plate from the stud.

In another aspect of the disclosure, an attachment assembly is configured for attachment to a stud having external teeth. The attachment assembly includes a sheet of material and a retention clip assembly. The retention clip assembly includes a base plate and a cover plate. The base plate includes a base rim and a locking finger. The base rim defines a base opening and the locking finger extends from the base rim. The base rim defines a base opening that is configured for receiving the stud therethrough. The cover plate includes a cover rim and a flange. The cover rim has a conical shape. The cover rim defines a cover opening that is configured for receiving the stud therethrough. The cover rim defines a lock opening that is spaced from the cover opening and is configured for receiving the locking finger therein to retain the cover plate to the base plate. The flange extends inwardly from the cover rim at an angle which is acute such that the flange overlays the cover opening and is configured for engaging the external teeth on the stud. The cover plate is configured for attachment to the base plate with a sheet of material therebetween, such that the cover plate and base plate are configured to be positioned such that the stud extends through the respective cover opening and base opening and the flange engages the external teeth of the stud to prevent removal of the cover plate and base plate from the stud.

In yet another aspect of the disclosure, a vehicle includes a panel, a stud, a sheet of material, and a retention clip assembly. The stud has external teeth and extends from the panel. The retention clip assembly includes a base plate and a cover plate. The base plate includes a base rim and a locking finger. The base rim defines a base opening and the locking finger extends from the base rim. The base rim defines a base opening where the stud is received therethrough. The cover plate includes a cover rim and a flange. The cover rim has a conical shape. The cover rim defines a cover opening where the stud is received therethrough. The cover rim defines a lock opening that is spaced from the cover opening with the locking finger disposed therein to retain the cover plate to the base plate. The flange extends inwardly from the cover rim at an angle which is acute such that the flange overlays the cover opening and engages the external teeth on the stud. The cover plate is attached to the base plate with the sheet of material therebetween, with the cover plate and base plate positioned such that the stud extends through the respective cover opening and base opening and the flange engages the external teeth of the stud to prevent removal of the cover plate and base plate from the stud.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
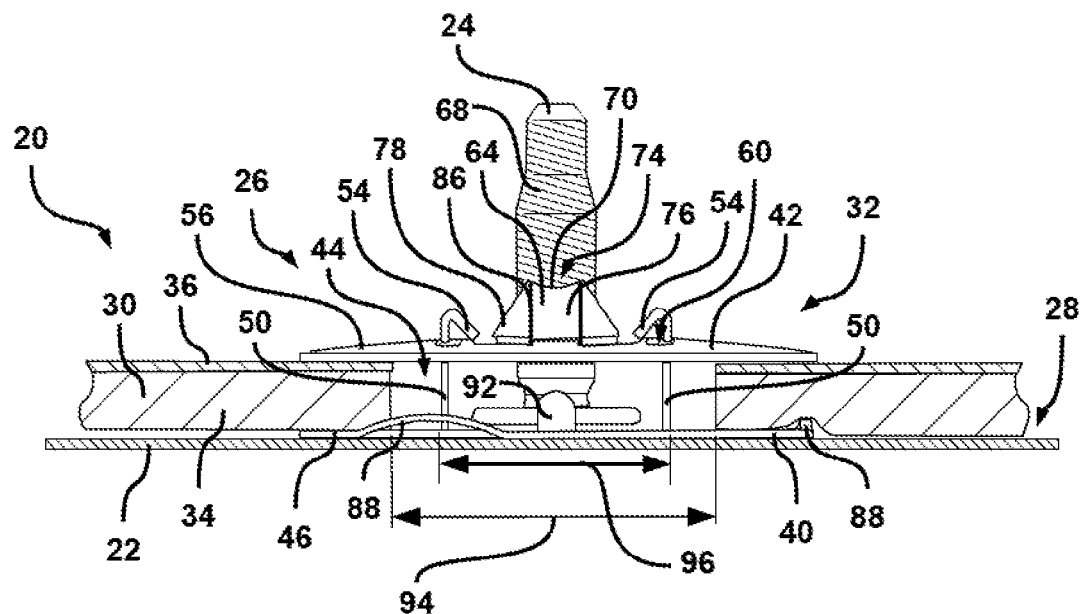
FIG. 1 is a schematic partial cross-sectional side view of a stud extending from a panel of a vehicle with a retention clip assembly attached to the stud.
Figure 2:
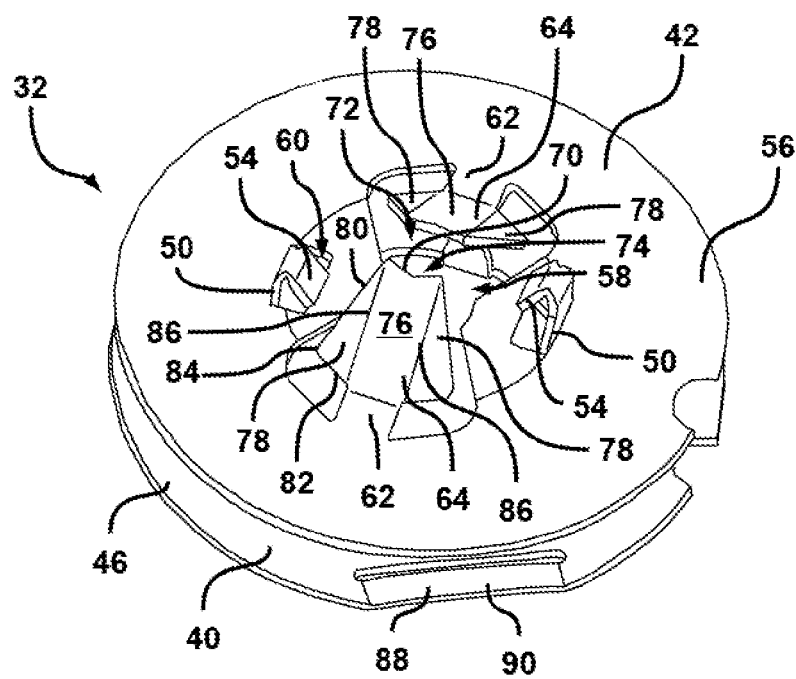
FIG. 2 is a schematic top perspective view of the retention clip assembly of the attachment assembly.

With reference to the drawings, wherein like reference numbers refer to the same or similar components throughout the several views, FIG. 1 shows a vehicle 20 including a panel 22 with a stud 24 extending from the panel 22 and an attachment assembly 26 attached to the stud 24. The panel 22 may be sheet metal that defines a tunnel of an underside 28 of the vehicle 20. The tunnel may be configured for receiving an exhaust pipe (not shown). It should be appreciated that the sheet of material 30 is not limited to being used on an underside 28 of the vehicle 20, but may be any panel 22.

The attachment assembly 26 includes a sheet of material 30 and a retention clip assembly 32. The sheet of material 30 is attached to the underside 28 of the vehicle 20. The sheet of material 30 may be an insulating sheet of material 30 including a first layer 34 and a second layer 36, overlaying the first layer 34. The first layer 34 may include fiber glass and the second layer 36 may include an aluminum foil. The aluminum foil is operatively disposed, relative to the underside 28 of the vehicle 20, such that the aluminum foil faces a street side, i.e., faces away from the underside 28 of the vehicle 20. The sheet of material 30 functions as a barrier against heat and/or noise intrusion into a passenger cabin (not shown) of the vehicle 20. It should be appreciated that the sheet of material 30 is not limited to having a first layer 34 and a second layer 36, as any desired number of layers 34, 36 may be used.

The retention clip assembly 32 is attached to the sheet of material 30 to secure the sheet of material 30 to the stud 24. It should be appreciated that while only a single stud 24 and retention clip assembly 32 are illustrated in FIG. 1, any desired number of studs 24 and retention clip assemblies 32 may be used to attach the sheet of material 30 to the underside 28 of the vehicle 20. By way of a non-limiting example, there may be six studs 24 and six corresponding retention clip assemblies 32 to secure the sheet of material 30 to the underside 28 of the vehicle 20.

The retention clip assembly 32 includes a base plate 40 and a cover plate 42. The base plate 40 and the cover plate 42 are operatively disposed on opposing sides of the sheet of material 30, over a corresponding receiving hole 44 defined in the sheet of material 30. The base plate 40 and the cover plate 42 are in interlocking relationship with one another such that the sheet of material 30 is compressed therebetween, as explained in more detail below. More specifically, with continued reference to FIG. 1, the base plate 40 may be disposed adjacent the first layer 34 and the cover plate 42 may be disposed adjacent the second layer 36, such that the sheet of material 30 is sandwiched therebetween. The retention clip assembly 32 may be formed from steel having a Rockwell C hardness between 30-36.

Figure 3:
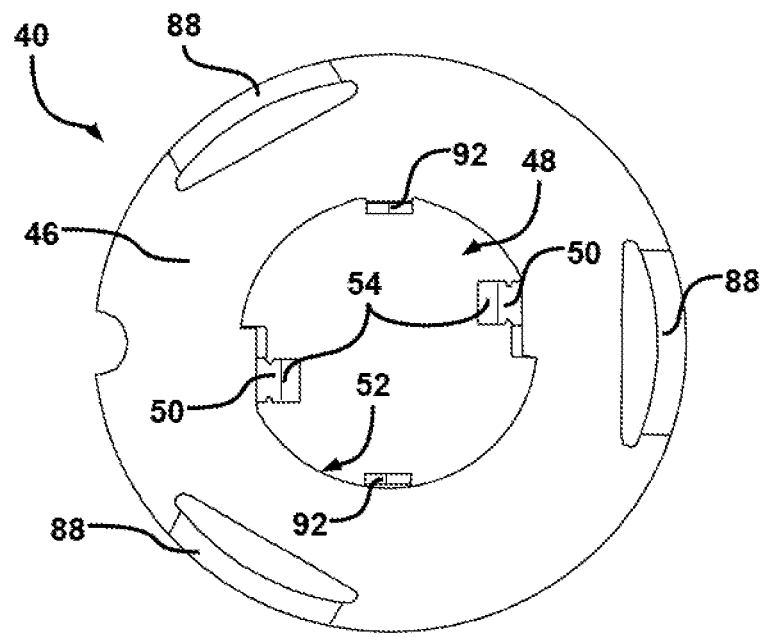
FIG. 3 is a schematic top view of a base plate of the retention clip assembly.

The base plate 40 may be annular and include a base rim 46 defining a base opening 48 which is aligned with the corresponding receiving hole 44 in the sheet of material 30. Referring to FIGS. 1 and 3, at least one locking finger 50 extends from an inner periphery 52 of the base rim 46. More specifically, the base plate 40 includes a pair of locking fingers 50 extending in parallel relationship to one another, through the receiving hole 44, toward the cover plate 42. Additionally, a flap 54 may extend from each locking finger 50 that is folded toward the respective locking finger 50 to provide a v-shape between the flap 54 and the respective locking finger 50.

Figure 4:
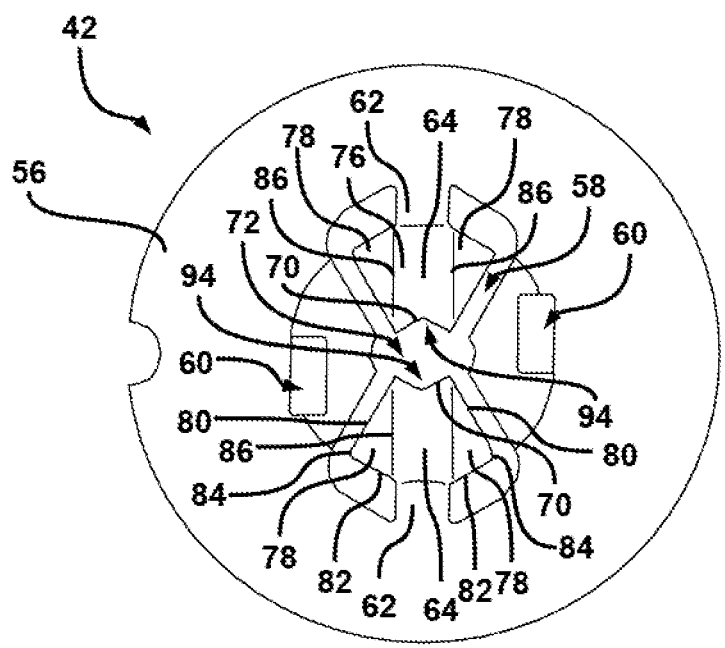
FIG. 4 is a schematic top view of a cover plate of the retention clip assembly.
Figure 5:
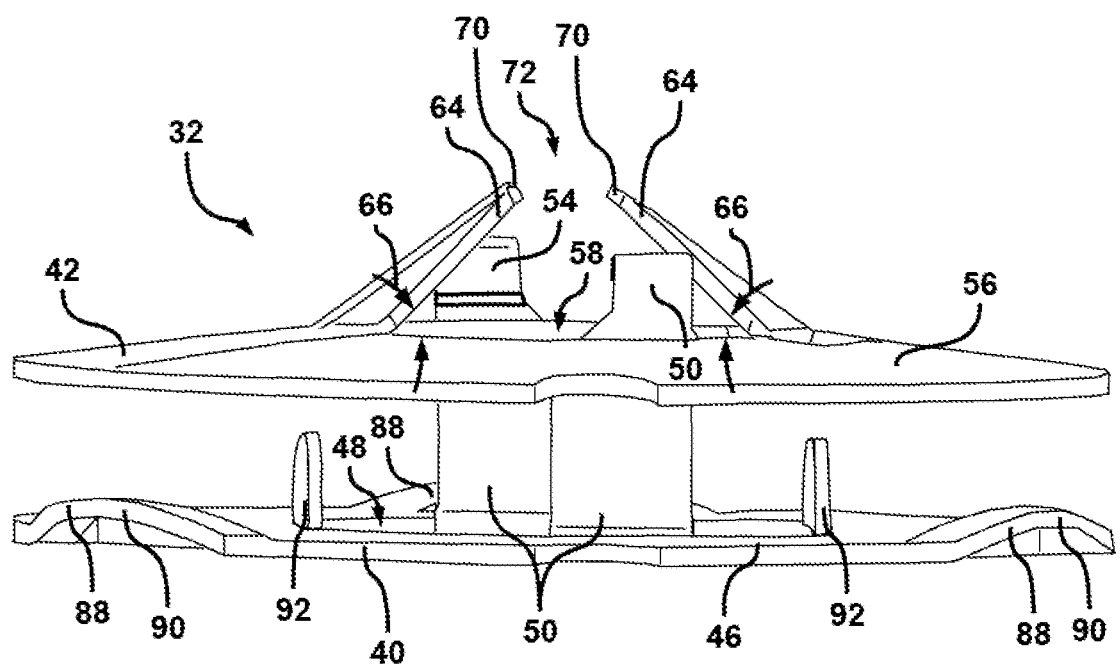
FIG. 5 is a schematic side view of the retention clip assembly.

With reference to FIGS. 1 and 5, the cover plate 42 includes a cover rim 56 having a conical shape. The cover rim 56 defines a cover opening 58 which is also aligned with the corresponding stud 24 and receiving hole 44 in the sheet of material 30. The cover rim 56 may also define at least one lock opening 60 which is radially spaced from the cover opening 58. More specifically, with reference to FIG. 4, the cover plate 42 may define a pair of diametrically opposed and offset lock openings 60. The lock openings 60 are configured for receiving a respective one of the locking fingers 50 to lock the cover plate 42 to the base plate 40. As each locking finger 50 is aligned with the respective lock opening 60, the flap 54 and the locking finger 50 extend through the respective lock opening 60 and the flap 54 is configured to engage the cover plate 42 as the locking finger 50 extends through the lock opening 60 to retain the base plate 40 to the cover plate 42. The locking fingers 50 and lock openings 60 are diametrically offset from one another as a way of error proofing so as to prevent the cover plate 42 from being attached to the base plate 40 upside down.

The cover rim 56 includes at least one tab 62 that radially extends into the opening. A flange 64 extends from the tab 62 inwardly at an angle 66 which is acute, relative to the tab 62. As such, the flange 64 overlays the cover opening 58 and is configured for engaging external teeth 68 on the stud 24. The flange 64 may be a pair of diametrically opposed flanges 64 that extend from the cover rim 56 to a locking end 70 such that a locking hole 72 is defined between the pair of opposing locking ends 70. The locking hole 72 receives the stud 24 therethrough such that the locking ends 70 engage the external teeth 68 of the stud 24. Each locking end 70 may define a v-shaped groove 74 to provide increase surface area to contact the external teeth 68 of the stud 24.

Each flange 64 may have a generally arrowhead shape such that each flange 64 includes an arm portion 76 and a pair of fins 78. The arm portion 76 has a rectangular shape. The arm portion 76 extends from the tab 62 to the locking end 70 such that a pair of sides 38 extends between the cover rim 56 and the locking end 70. The fins 78 may be triangular in shape. Therefore, each fin 78 includes a first edge 80 and a second edge 82, where each edge 80, 82 extends from the respective side 38 of the arm portion 76 such that the first and second edges 80, 82 intersect with one another at a corner 84. A fold line 86 is defined between the arm portion 76 and each of the fins 78, along the respective side 38, and each fin 78 is folded at the fold line 86, relative to the arm portion 76, toward the cover opening 58. The fold lines 86 function as strengthening ribs to prevent undesired deformation of the flange 64 as the flange 64 engages the external teeth 68 of the respective stud 24. The prevention of the undesired deformation of the flanges 64 when the retention clip assembly 32 is attached to the respective stud 24. When the cover plate 42 is attached to the base plate 40, the flanges 64 extend generally opposite the base plate.

With reference to FIG. 1, the cover plate 42 is attached to the base plate 40 with the sheet of material 30 therebetween such that the cover plate 42 and base plate 40 are positioned with the stud 24 extending through the base opening 48, the receiving hole 44, the cover opening 58, and the locking hole 72 such that the flange 64 engages the external teeth 68 of the stud 24 to prevent removal of the cover plate 42 and base plate 40 from the stud 24. As the retention clip assembly 32 is pushed onto the stud 24, the flanges 64 are configured such that the retention clip assembly 32 can be installed with very little effort, while requiring an extraction force to remove the retention clip assembly 32 from the stud 24 which is very high. By way of a non-limiting example, the retention clip assembly 32 may be configured to be installed to the stud 24 by exerting approximately 8 pounds of force, while requiring approximately 250 pounds of force to be extracted from the stud 24. The combination of the conical shape of the cover rim 56 and the angle 66 of the flanges 64, which extend from the cover rim 56, help to resist deflection and deformation of the cover plate when attempting to extract the retention clip assembly 32 from the stud 24.

Referring now to FIGS. 1-3 and 5, the base plate 40 may include at least one lobe 88 that flexibly extends toward the cover plate 42. More specifically, referring to FIG. 3, the base plate 40 includes three lobes 88 radially surrounding the base opening 48 in evenly spaced relationship to one another. Each lobe 88 is integrally formed from the base rim 46 to form an arched cutout 90. The lobes 88 are biased against the sheet of material 30 when the cover plate 42 is connected to the base plate 40 such that the base plate 40 and the cover plate 42 are in tension with one another and a tight fit between the retention clip assembly 32 and the sheet of material 30 is achieved. The tight fit helps to prevent squeaks and rattles during operation of the vehicle 20.

Additionally, with continued reference to FIG. 3, a pair of lips 92 may extend from the inner periphery 52 of the base rim 46 in diametric opposition to one another. Therefore, the lips 92 and the locking fingers 50 are disposed in alternating relationship to one another about the inner periphery 52. The locking fingers 50 and the lips 92 cooperate to limit the travel of the base plate 40 within the receiving hole 44. It should be appreciated that a diameter 94 of the receiving hole 44 may be larger than a diameter 96 defined by the locking fingers 50 and lips 92 such that the retention clip assembly 32 has the ability to float within the receiving hole 44 to help locate the stud 24 where the retention clip assembly 32 is being installed.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A retention clip assembly configured for attachment to a stud having external teeth, the retention clip assembly comprising:
   a base plate including a base rim defining a base opening and a locking finger extending from the base rim;
   wherein the base opening is configured for receiving the stud therethrough;
   a cover plate including:
      a cover rim having a conical shape;
      wherein the cover rim defines a cover opening configured for receiving the stud therethrough;
      wherein the cover rim defines a lock opening spaced from the cover opening and configured for receiving the locking finger therein to retain the cover plate to the base plate; and
      a flange extending inwardly from the cover rim at an angle which is acute such that the flange overlays the cover opening and is configured for engaging the external teeth on the stud;
      wherein the flange is arrowhead shaped and includes:
         an arm portion having a rectangular shape;
         wherein the arm portion extends from the cover rim to a locking end such that a pair of sides extend between the cover rim and the locking end; and
         a pair of fins extending from a respective side;
   wherein the cover plate is configured for attachment to the base plate with a sheet of material therebetween, with the cover plate and base plate positioned such that the stud extends through the respective cover opening and base opening and the flange engages the external teeth of the stud to prevent removal of the cover plate and base plate from the stud.

2. The retention clip assembly, as set forth in claim 1, wherein the locking finger is further defined as a pair of diametrically opposed locking fingers extending in parallel relationship to one another; and
   wherein the lock opening is further defined as a pair of diametrically spaced lock openings configured for receiving a respective one of the locking fingers to lock the cover plate to the base plate.

3. The retention clip assembly, as set forth in claim 2, wherein the locking fingers are further defined as being diametrically opposed and offset from one another; and
   wherein the lock openings are diametrically opposed and offset from one another such that the cover plate can only be attached to the base plate with the flange extending opposite the base plate.

4. The retention clip assembly, as set forth in claim 1, wherein the flange is a pair of flanges;
   wherein each flange extends from the cover rim to a locking end such that a locking hole is defined between the pair of opposing locking ends;
   wherein the locking hole is configured to receive the stud therethrough such that the locking ends engage the external teeth of the stud.

5. The retention clip assembly, as set forth in claim 4, wherein each locking end defines a v-shaped groove.

6. The retention clip assembly, as set forth in claim 1, wherein the fins are triangular in shape.

7. The retention clip assembly, as set forth in claim 1, wherein the base plate includes a lobe flexibly extending from the base rim; and
   wherein the lobe forms an arch that is configured to bias against the sheet of material when the cover plate is attached to the base plate with the sheet of material therebetween.

8. An attachment assembly configured for attachment to a stud having external teeth, the attachment assembly comprising:
   a sheet of material; and
   a retention clip assembly including:
      a base plate including a base rim defining a base opening and a locking finger extending from the base rim in spaced and parallel relationship to one another;
      wherein the base opening is configured for receiving the stud therethrough; and
      a cover plate having:
         a cover rim having a conical shape;
         wherein the cover rim defines a cover opening configured for receiving the stud therethrough;
         wherein the cover rim defines a pair of lock openings spaced from the cover opening;
         wherein the pair of lock openings are diametrically spaced and offset from one another and configured for receiving the locking finger therein to retain the cover plate to the base plate such that the cover plate can only be attached to the base plate with the flange extending opposite the base plate; and
         a flange extending inwardly from the cover rim at an angle which is acute such that the flange overlays the cover opening and is configured for engaging the external teeth on the stud;
   wherein the cover plate is attached to the base plate with the sheet of material therebetween, such that the cover plate and base plate are configured to be positioned such that the stud extends through the respective cover opening and base opening and the flange engages the external teeth of the stud to prevent removal of the cover plate and base plate from the stud.

9. The attachment assembly, as set forth in claim 8, wherein the flange is a pair of flanges;
   wherein each flange extends from the cover rim to a locking end such that a locking hole is defined between the pair of opposing locking ends;
   wherein the locking hole is configured to receive the stud therethrough such that the locking ends engage the external teeth of the stud.

10. The attachment assembly, as set forth in claim 9, wherein each locking end defines a v-shaped groove.

11. The attachment assembly, as set forth in claim 8, wherein the flange is arrowhead shaped and includes:
   an arm portion having a rectangular shape;
   wherein the arm portion extends from the cover rim to a locking end such that a pair of sides extend between the cover rim and the locking end; and
   a pair of fins extending from a respective side.

12. The attachment assembly, as set forth in claim 11, wherein the fins are triangular in shape.

13. The retention clip assembly, as set forth in claim 8, wherein the base plate includes a lobe flexibly extending from the base rim; and wherein the lobe forms an arch that is configured to bias against the sheet of material when the cover plate is attached to the base plate with the sheet of material therebetween.

14. The attachment assembly, as set forth in claim 8, wherein the flange extends away from the base plate.

15. A vehicle comprising:

a panel;

a stud having external teeth extending from the panel;

a sheet of material; and a retention clip assembly including:

a base plate including a base rim defining a base opening and a pair of locking fingers extending from the base rim in parallel relationship to one another;

wherein the stud extends through the base opening; and a cover plate having:

a cover rim having a conical shape;

wherein the cover rim defines a cover opening with the stud extending therethrough;

wherein the cover rim defines a pair of lock openings spaced from the cover opening;

wherein the pair of lock openings are diametrically spaced and offset from one another and configured for receiving the locking finger therein to retain the cover plate to the base plate such that the cover plate can only be attached to the base plate with the flange extending opposite the base plate; and a flange extending inwardly from the cover rim at an angle which is acute such that the flange overlays the cover opening and engages the external teeth on the stud;

wherein the cover plate is attached to the base plate with the sheet of material therebetween, with the cover plate and base plate positioned such that the stud extends through the respective cover opening and base opening and the flange engages the external teeth of the stud to prevent removal of the cover plate and base plate from the stud.

16. The vehicle, as set forth in claim 15, the flange including:

an arm portion having a rectangular shape;

wherein the arm portion extends from the cover rim to a locking end such that a pair of sides extend between the cover rim and the locking end; and a pair of fins extending from a respective side.

\* \* \* \* \*